United States Patent Office 3,321,519
Patented May 23, 1967

3,321,519
PRODUCTION OF ALKYLISOTHIOURONIUM SALTS
Clarence R. Bresson, Bartlesville, Okla., assignor to Phillips Petroleum Company, a corporation of Delaware
No Drawing. Filed Sept. 26, 1963, Ser. No. 311,627
7 Claims. (Cl. 260—564)

This invention relates to the prepartaion of compounds useful in alleviating the effects of radiation upon mammals. In one aspect, it relates to a novel method for the synthesis of substituted aminoalkylisothiouronium salts.

The adverse effects of radiation upon the life processes of mammals are too well known to require documentation.

Workers in the art of radiation biology have postulated the sequence of events in mammalian tissue after irradiation, from energy absorption to the death of the organism. Protection and/or reversal can be provided by intervention at many stages. Typically, the presence of appropriate chemical compounds may affect the degenerative steps of initial chemical lesion and biochemical lesion, either by diverting the absorbed energy to the destruction of an extraneous molecule (the protective agent), by providing means of repair of the initial chemical lesion before a biochemically critical molecule can be altered, or by altering the biochemical target so that it is less readily damaged.

There has been interest in the compounds of the aminoalkylisothiourea type, and substituted aminoalkylisothiouronium salts derived therefrom, as potential radiation-protective compounds.

The prior art discloses, for example, the preparation of 3-amino-propylisothiourea by the reaction of thiourea with halogen-substituted alkylamine. Such substituted isothioureas undergo a series of transformations, such as an intratransguanylation reaction, to form mercaptoalkylguanidines. However, the procedure employed requires several steps for the production of these radiation-protective compounds.

It is, therefore, an object of this invention to provide an improved process for the production of guanido-substituted alkane thiols and S-substituted isothiouronium salts.

According to the processes of this invention, compounds of the formulas:

$$R_1-N-\overset{N-R_1}{\overset{\|}{C}}-N-R_2-S-R_3 \text{ and } Y-R_2-S-\overset{N-R_1}{\overset{\|}{C}}-N-R_1$$
$$\hspace{2.5cm} R_1 \hspace{4cm} R_1$$

wherein each $R_1$ is selected from the group consisting of hydrogen and alkyl, aryl, alkaryl, aralkyl, cycloalkyl, alkylcycloalkyl, and cycloalkylalkyl radicals containing from 1 to 8 carbon atoms, inclusive, wherein $R_2$ is selected from the group consisting of alkylene and arylene radicals containing from 1 to 8 carbon atoms, wherein $R_3$ is selected from the group consisting of hydrogen and $$-\overset{N-R_1}{\overset{\|}{C}}-N-R_1$$
$$\hspace{0.7cm} R_1$$

wherein Y is selected from the group consisting of hydrogen,

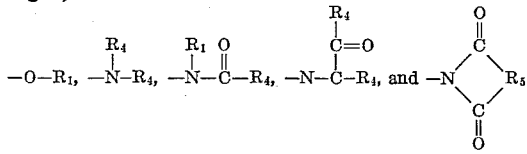

wherein each $R_4$ is a 1 to 8 carbon alkyl radical, and wherein $R_5$ is selected from the group consisting of alkylene, arylene, and combinations thereof containing from 1 to 8 carbon atoms, are prepared by reaction of a mercapto compound of the formulas:

$$Y-R_2-SH, \text{ and } H-\overset{R_1}{\underset{|}{N}}-R_2-SH$$

with a salt of a compound of the formula

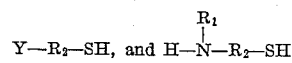

wherein $R_6$ is selected from the group consisting of hydrogen and 1 to 8 carbon alkyl radicals.

When $R_6$ is an alkyl group, the compounds of the formula

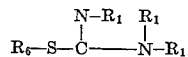

are salts of S-alkylisothiourea. When $R_6$ is hydrogen, the compounds are salts of thiourea as shown in its tautomeric form. These salts can be of either inorganic or organic acids, including such acids as sulfuric, hydrochloric, acetic, propionic, benzoic, p-toluenesulfonic, and the like.

The description given for $R_5$ above defines this bivalent radical as alkylene, arylene or combinations thereof. The language "combinations thereof" is intended to include, for example, such radicals as 2-methyl-p-phenylene, p-phenylenemethyl, xylylene, and the like.

When an isothiourea salt as described above reacts with a mercaptan as defined above, the first reaction that occurs is at the mercaptan group, with a mercaptan or $H_2S$ being evolved, depending upon whether or not $R_6$ is hydrogen or an alkyl radical. If the other end of the mercaptan molecule is terminated with Y, no further reaction occurs, however, if the other end is terminated with an amino group as shown, transguanylation occurs, thus again providing a terminal mercapto group for further reaction.

The mol ratio of isothiourea salt reactant is to mercapto reactant generally is within the range from 4/1 to 1/4. The first reaction product is best illustrated by considering the reaction of one mol of S-methylisothiouronium hydrochloride with one mol of 3-aminopropane thiol:

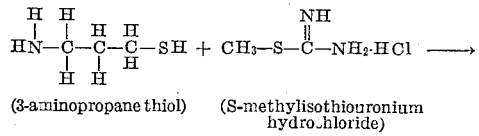

(3-aminopropane thiol)    (S-methylisothiouronium hydrochloride)

yielding

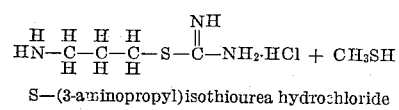

S—(3-aminopropyl)isothiourea hydrochloride

This intermediate hydrohalide may undergo transguanylation:

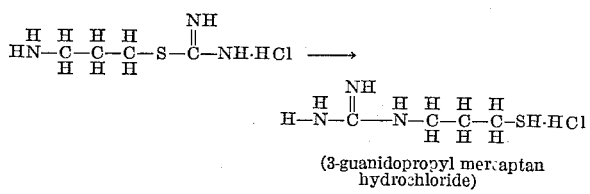

(3-guanidopropyl mercaptan hydrochloride)

The mercaptan product will then react further with an additional mol of S-methylisothiouronium hydrochloride:

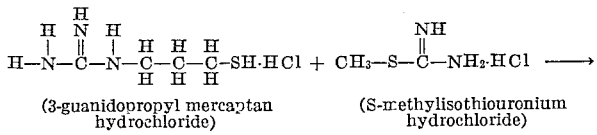

(3-guanidopropyl mercaptan hydrochloride)   (S-methylisothiouronium hydrochloride)

yielding

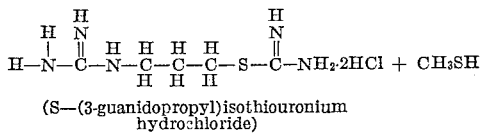

(S—(3-guanidopropyl)isothiouronium hydrochloride)

Thus, if an excess of the S-alkylisothiourea salt is used, $R_3$ in the first product formula above will be

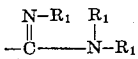

whereas if an excess of the mercapto-substituted amine reactant of the second formula is used, $R_3$ will be hydrogen. Thus, one can obtain the desired product by proper variation of the mol ratio of reactants.

The process is effected by contacting the reactants in water, or in an aliphatic alcohol of from 1 to 4 carbon atoms, or in a mixture of water and an alcohol, preferably containing at least 50 percent by weight water. The reaction is carried out at a temperature generally ranging from 10–100° C. Recovery of the products can be effected by such known methods as fractional distillation, crystallization, and the like.

Some examples of mercapto compounds which can be employed in the process of this invention are: methyl mercaptan, ethyl mercaptan, n-butyl mercaptan, 2-ethylhexyl mercaptan, 2-hydroxyethyl mercaptan, 6-hydroxyhexyl mercaptan, 3-methyl-6-hydroxyheptyl mercaptan, 3-phenyl propyl mercaptan, 4-p-tolylbutyl mercaptan, 5-cyclohexylhexyl mercaptan, 8-(2-ethylphenyl)octyl mercaptan, 4-cyclooctylpentyl mercaptan, 5-methoxypentyl mercaptan, 6-n-butoxyoctyl mercaptan, 3-n-octyoxypropyl mercaptan, 6-phenoxyhexyl mercaptan, 7-benzyloxyheptyl mercaptan, 8-(4-methylcycloheptoxy)octyl mercaptan, 2-(N,N-dimethyl)aminopropyl mercaptan, 4-(N,N-di-n-octylamino) hexyl mercaptan, 6-(N-acetamido) hexyl mercaptan, 5-(N-ethyl-N-butyramido)heptyl mercaptan, 8-(N-phenyl-N-pelargonamide)octyl mercaptan, 4-(N,N-acetylamino)pentyl mercaptan, 7-phthalimidoheptyl mercaptan, 4-succinimidobutyl mercaptan, 6-(cyclohexane-1,4-dicarbonimido)hexyl mercaptan, aminomethyl mercaptan, 2-(N-ethylamino)ethyl mercaptan, 2-(N-isobutylamino)propyl mercaptan, 3 - (N - n - pentylamino) - propyl mercaptan, 2,2 - dimethyl-3-(N-n-octylamino)hexyl mercaptan, 8-(N-phenylamino)octyl mercaptan, 4-(N-cyclohexylamino)phenyl mercaptan, 5-(N-[2-phenylethyl]amino)pentyl mercaptan, 6-(N-[4-ethylphenyl]amino)heptyl mercaptan, 4-(N-cyclooctylamino)octyl mercaptan, 3-aminopropyl mercaptan, and the like.

Specific examples of salts of isothioureas which can be used as reactants are: thiourea hydrobromide, N,N-dimethylthiourea hydrochloride, N,N,N'-triphenylthiourea sulfate, S-methylisothiourea hydrochloride, S-methylisothiourea sulfate, N-methyl-S-ethylisothiourea acetate, N,N-diethyl-S-isothiourea acetate, N-ethyl-N'-methyl-S-isobutylisothiourea propionate, N-phenyl-S-n-pentylisothiourea acetate, N,N,N'-trimethyl-S-n-octylisothiourea benzoate, N-cyclooctyl-S-methylisothiourea phosphate, N-benzyl-N'-methyl-S-ethylisothiourea lactate, and the like.

The products of this invention are particularly useful as antiradiation drugs, but also as pesticides, as crosslinking agents for rubber and the like.

Some examples of radiation protection agents which can be prepared according to the process of this invention are:

1-methyl-2-capramido-1-ethylisothiouronium salicylate
3-lactamido-1-propylisothiouronium hydrochloride
3-guanido-1-propanethiol hydrochloride
3-guanido-1-propylisothiouronium hydrochloride
S-(2-[N,N-dimethylamino]ethyl)isothiouronium bromide hydrobromide
S-(3 - [N,N - dicyclohexylamino]propyl)isothiouronium bromide hydrobromide
S-(2-[N,N-diphenylamino]butyl)isothiouronium bromide hydrobromide
2-caprylamido-1-ethylisothiouronium sulfate
S-(2-guanido-1-ethyl)isothiouronium sulfate
2-guanido-1-ethanethiol sulfate
3-guanido-1-propanethiol sulfate
3-acetamido-1-propylisothiouronium sulfate
S-(3-guanidopropyl)isothiouronium sulfate
S-(1-guanido-2-propyl)isothiouronium sulfate
S-(3-acetamidopropyl)-N'-methylisothiouronium sulfate
3-guanido-1-propanethiol-p-toluene sulfonate
S-(3-[N,N-di-p-tolylamino]propyl) - N,N' - dimethylisothiouronium sulfate
S-n-octylisothiouronium hydrobromide
S-(4-hydroxybutyl)isothiouronium sulfate
S-(5-cyclohexoxypentyl)isothiouronium acetate
S-(6-phenoxyoctyl)isothiouronium acetate
S-(8-phthalimidooctyl)isothiouronium propionate
S-(5 - [N,N - di-n-butylamino]pentyl)isothiouronium hydrochloride
S-(4-[N,N,N'-triphenylguanido]butyl) - N,N,N'-triphenylisothiouronium sulfate
S-(3-[N,N'-diacetylamino]propyl)isothiouronium phosphate.

The following specific examples are intended to illustrate the advantages of the process of this invention, but are not intended to be unduly limiting.

EXAMPLE I

A run was carried out in which 3-amino-1-propanethiol was reacted with the sulfate salt of S-methylisothiourea according to the process of the invention to prepare 3-guanido-1-propanethiol sulfate.

In this run, 18.2 grams (0.2 mol) of 3-amino-1-propanethiol was mixed with 100 ml. of methanol and warmed sufficiently to cause the thiol to dissolve. This solution was then added to a solution of 27.8 grams (0.1 mol) of S-methylisothiouronium sulfate $$(CH_3-S-\overset{NH}{\underset{\|}{C}}-NH_2)_2 \cdot H_2SO_4$$

in 50 ml. of water. Mixing of the two causes a vigorous evolution of methyl mercaptan as a gas. The resulting solution was stirred for 3 hours and then stripped under vacuum to yield a viscous liquid which crystallized from methanol after prolonged standing in a refrigerator. This compound melted at 129–131° C. An elemental analysis of the product gave the following results:

| Element | Calculated for: $C_8H_{24}N_6O_4S_3$ | Found |
| --- | --- | --- |
| Carbon | 26.36 | 26.25 |
| Hydrogen | 6.64 | 6.6 |
| Nitrogen | 23.07 | 22.8 |
| Sulfur (Mercaptan) | 17.56 | 16.1 |
| Total Sulfur | 26.38 | 25.0 |

The yield of 3-guanido-1-propanethiol sulfate was 73 percent of theoretical.

The above prepared product was converted to the p-toluenesulfonate salt in the following manner. A solution of 37.9 grams (0.1 mol) of 3-guanido-1-propanethiol sulfate in 150 ml. of water was treated with 31.5 grams (0.1 mol) of barium hydroxide octahydrate. A white solid formed rapidly, and when the pH reached 10, the reaction was quenched with 21 ml. (0.25 mol) of concentrated hydrochloric acid. After filtering and stripping the filtrate, the filtrate was extracted with a mixture of tetrahydrofuran and butanol, and to this solution was added 38.8 grams (0.2 mol) of sodium p-toluene sulfonate. After heating, the sodium chloride which separated from the hot solution was filtered out, and the filtrate was stripped under vacuum to yield a viscous oil. This material was then crystallized from isopropyl alcohol to yield a product melting 84–85.5° C. This material was then subjected to elemental analysis.

| Element | Calculated for: $C_{11}H_{19}N_3O_3S_2$ | Found |
|---|---|---|
| Carbon | 43.26 | 43.4 |
| Hydrogen | 6.27 | 6.2 |
| Nitrogen | 13.76 | 13.86 |
| Sulfur (Mercaptan) | 10.5 | 9.0 |
| Total Sulfur | 21.0 | 20.7 |

EXAMPLE II

In another run, a solution of 55.6 grams (0.2 mol) of S-methylisothiouronium sulfate

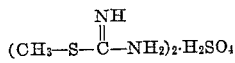

in 100 ml. of water was mixed with 18.2 grams (0.2 mol) of solid 3-amino-1-propanethiol. The mixture was stirred at room temperature to effect solution, and methyl mercaptan was evolved during stirring. The solution crystallized on standing overnight. Then the precipitate was filtered out and dried to yield a crude product, melting at 230–232° C. with decomposition. This crude product represents a 90 percent of theoretical yield. S-(3-guanidopropyl)isothiouronium sulfate was obtained fater two recrystallizations from hot water. This material melted at 238° C. with decomposition. An elemental analysis of this material gave the following results:

| Element | Calculated for: $C_5H_{15}N_5O_4S_2$ | Found |
|---|---|---|
| Carbon | 21.97 | 21.9 |
| Hydrogen | 5.53 | 6.0 |
| Nitrogen | 25.63 | 25.6 |
| Sulfur | 23.46 | 23.8 |

EXAMPLE III

In still another run, S-(1-guanido-2-propyl)isothiouronium sulfate was prepared by the method of this invention. In this run, 18.2 grams (0.2 mol) of solid 1-amino-2-propanethiol was added to a solution of 55.6 grams (0.2 mol) of S-methylisothiouronium sulfate in 100 ml. water. The solution was heated to 40° C., then cooled to room temperature and maintained at this temperature for two hours. After standing overnight, the solution was stripped under vacuum to yield a semisolid. A recrystallization from 30 percent aqueous methanol yielded S-(1-guanido-2-propyl)isothiouronium sulfate, melting at 219–220° C. with decomposition. An elemental analysis of this compound gave the following results:

| Element | Calculated for: $C_5H_{15}N_5O_4S_2$ | Found |
|---|---|---|
| Carbon | 21.97 | 21.7 |
| Hydrogen | 5.53 | 5.3 |
| Nitrogen | 25.6 | 23.5 |
| Sulfur | 23.46 | 23.9 |

EXAMPLE IV

In still another run, 3-acetamido-1-propylisothiouronium sulfate was prepared by the method of this invention. A solution of 27.8 g. (0.1 mol) of S-methylisothiouronium sulfate, 26.6 g. (0.2 mol) of 1-acetamido-3-propanethiol in 100 ml. of water was heated at 40° for 2 hours with evolution of methyl mercaptan. The solution was then heated at 70° for 1 hour, cooled to room temperature and stripped to a viscous liquid, which was crystallized from a mixture of methanol and tetrahydrofuran and recrystallized from methanol-n-propanol, to give a 26 percent yield of 3-acetamido-1-propylisothiouronium sulfate, melting at 175–176° C. An elemental analysis of the compound gave the following results:

| Element | Calculated for: $C_5H_{15}N_5O_4S_2$ | Found |
|---|---|---|
| Carbon | 32.13 | 31.7 |
| Hydrogen | 6.29 | 7.3 |
| Nitrogen | 18.78 | 18.7 |
| Sulfur | 21.44 | 22.1 |

Reasonable variation and modification are possible within the scope of the foregoing disclosure and the appended claims.

I claim:
1. Process for the manufacture of compounds of the formula

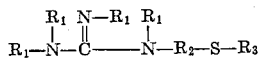

wherein each $R_1$ is selected from the group consisting of hydrogen and alkyl, aryl, alkaryl, aralkyl, cycloalkyl, alkylcycloalkyl, and cycloalkylalkyl radicals containing from 1 to 8 carbon atoms, inclusive, wherein $R_2$ is selected from the group consisting of alkylene and arylene radicals containing from 1 to 8 carbon atoms, wherein $R_3$ is

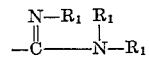

which comprises: reacting a salt of a thiourea of the formula:

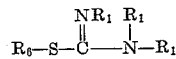

wherein $R_6$ is selected from the group consisting of hydrogen and an alkyl radical having 1 to 8 carbon atoms, and $R_1$ is selected from the group consisting of hydrogen, alkyl, aryl, alkaryl, aralkyl, and cycloalkyl radicals having from 1 to 8 carbon atoms; with a mercapto compound of the formula:

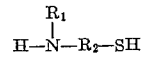

wherein $R_2$ is selected from the group consisting of alkylene and arylene radicals having from 1 to 8 carbon atoms; and the mol ratio of said thiourea salt reactant to said mercapto compound reactant is in the range of 4:1 to 2:1.

2. Process for the manufacture of a salt of S-3-guanido-1-propylisothiourea, which comprises:
    reacting one mol of 3-aminopropanethiol with at least two mols of a salt of S-methylisothiourea with the liberation of gaseous methyl mercaptan as co-product.

3. Process for the manufacture of 3-guanido-1-propylisothiouronium hydrochloride, which comprises:
    reacting one molar equivalent of 3-aminopropanethiol with at least two mols of S-methylisothiouronium HCl with the liberation of two mols of gaseous methyl mercaptan as co-product.

4. Process for the manufacture of 3-guanido-1-propylisothiouronium sulfate, which comprises:
    reacting one molar equivalent of 3-aminopropane thiol with at least two mols of S-methylisothiouronium sulfate with the liberation of two mols of gaseous methyl mercaptan as co-product.

5. Process for the manufacture of S-(3-guanidopropyl)isothiouronium sulfate, which comprises:
    reacting one mol equivalent of 3-amino-1-propanethiol with two molar equivalents of S-methylisothiouronium sulfate, with the liberation of gaseous methyl mercaptan as co-product.

6. Process for the manufacture of S-(1-guanido-2-propyl)isothiouronium sulfate which comprises:
reacting one mol equivalent of 1-amino-2-propanethiol with two molar equivalents of S-methylisothiouronium sulfate.

7. Process for the manufacture of a salt of S-3-guanido-1-propylisothiourea, which comprises:
reacting in the range of 10 to 100° C. one mol of 3-aminopropanethiol with at least two mols of a salt of S-methylisothiourea previously both dispersed in an aliphatic alcohol having from 1 to 4 carbon atoms with the liberation of gaseous methyl mercaptan as co-product.

References Cited by the Examiner

UNITED STATES PATENTS

| | | | |
|---|---|---|---|
| 1,785,916 | 12/1930 | Schotte | 260—564 |
| 2,302,762 | 11/1942 | Graenacher et al. | 260—564 X |
| 2,825,736 | 3/1958 | Cope et al. | 260—456 |

FOREIGN PATENTS 448,796  6/1936  Great Britain.

CHARLES B. PARKER, *Primary Examiner.*

ROBERT V. HINES, *Assistant Examiner.*